(12) United States Patent
Winter et al.

(10) Patent No.: US 9,785,590 B2
(45) Date of Patent: Oct. 10, 2017

(54) BUS AUTO-ADDRESSING SYSTEM

(71) Applicants: Darcy Winter, Moore, OK (US); Md M. Haque, Edmond, OK (US); Wolfram Ploetz, Camas, WA (US); Brady Johnson, Kalama, WA (US); Daniel E. Tooke, Boring, OR (US)

(72) Inventors: Darcy Winter, Moore, OK (US); Md M. Haque, Edmond, OK (US); Wolfram Ploetz, Camas, WA (US); Brady Johnson, Kalama, WA (US); Daniel E. Tooke, Boring, OR (US)

(*) Notice: Subject to any disclaimer, the term of this patent is extended or adjusted under 35 U.S.C. 154(b) by 469 days.

(21) Appl. No.: 14/179,557

(22) Filed: Feb. 13, 2014

(65) Prior Publication Data

US 2015/0227482 A1    Aug. 13, 2015

(51) Int. Cl.
| | |
|---|---|
| *G06F 13/38* | (2006.01) |
| *G06F 13/42* | (2006.01) |
| *G06F 13/372* | (2006.01) |
| *G06F 3/00* | (2006.01) |

(52) U.S. Cl.
CPC ........ *G06F 13/372* (2013.01); *G06F 13/4234* (2013.01)

(58) Field of Classification Search
None
See application file for complete search history.

(56) References Cited

U.S. PATENT DOCUMENTS

| | | | |
|---|---|---|---|
| 4,638,313 A | 1/1987 | Sherwood | |
| 4,680,583 A | 7/1987 | Grover | |
| 4,825,204 A | 4/1989 | Nakamura | |
| 5,233,346 A | 8/1993 | Minerd | |
| 5,304,992 A | 4/1994 | Harashima | |
| 5,680,113 A | 10/1997 | Allen | |
| 5,689,675 A | 11/1997 | Buij | |
| 5,708,831 A | 1/1998 | Schon | |
| 5,745,493 A | 4/1998 | St. Clair | |
| 5,768,277 A | 6/1998 | Ohno et al. | |
| 5,831,546 A | 11/1998 | Costa | |
| 5,872,524 A | 2/1999 | Iida | |
| 5,952,934 A | 9/1999 | Matsumoto | |
| 7,755,505 B2 | 7/2010 | Johnson | |
| 8,060,658 B2 | 11/2011 | McFarland | |
| 2013/0304859 A1* | 11/2013 | Gassion | H04L 12/281 709/217 |

* cited by examiner

*Primary Examiner* — Scott Sun
(74) *Attorney, Agent, or Firm* — Robert Anton Pasic (57) ABSTRACT

The invention pertains to automatically addressing devices on a network. The controller tests each address from a list of available addresses. If the control device receives a response the corresponding address is eliminated from the list of available addresses. The control device sends an arming signal which is received by all participating devices. The devices prepare for a triggering signal. When the trigger signal is received each device waits a random amount of time. During this time each device looks for communication on the bus, if communication is detected the device quits timing and remains unaddressed, if not it sends a signal to the control device to accept the address.

6 Claims, 6 Drawing Sheets

BUS AUTO-ADDRESSING SYSTEM

CROSS-REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO SEQUENCE LISTING, A TABLE, OR A COMPUTER PROGRAM LISTING COMPACT DISC APPENDIX

Not applicable.

BACKGROUND

The present invention relates to the electronic networking industry. This includes any device or system containing devices which communicate with each other via a bus connection. This bus connection could include wireless or wire connected bus systems and devices.

These network systems allow the communication among several interacting devices such as control components, mobile devices such as tablets and i-phones, industrial distributed modules including I/O modules and terminals.

Particularly, this discussion pertains to automatically addressing several modules for use in a network. In one embodiment of the invention several devices are connected to a controller thru a bus connection. The controller assigns specific addresses to modules so that the devices and the controller can communicate with each other.

The prior art cited in patent Ser. No. 08/060,658 (McFarland) discusses a daisy chain configured network. In this arrangement each device is in communication with the adjacent devices. At power up each device awaits a signal containing a series of pulses on its respective input bus connection. When this signal is received it outputs, to the adjacent device, a signal with an additional pulse. The last device in the network sends its signal back to a controller which is also connected on the daisy chained bus. The controller then assigns addresses to each device sequentially given the number of devices on the network.

This scheme of automated addressing though simple has several shortcomings. First if a device is not receptive to this addressing scheme it will not allow automated addressing of all devices on the network. Second there is no means of accounting for a device which has a hardwired address. For instance a device could not be given an address manually by setting latching switches. Third cycling power at the devices and the controller is required to initiate the addressing cycle. Depending on the type of controller, devices and most importantly the application, cycling power could damage a device or cause safety concerns.

Other prior art is cited which includes patent 07755505 (Johnson). Power up is also required to initiate this scheme. The controller issues a "Clear Found Flag" to all devices using each address, next it polls each address for an acknowledgement. If an address is received it stores the address and a random number that is generated by the responding device. Next the controller requests the serial number from the device. If a serial number has been received the serial number is saved at the controller. The controller sends a "Set Found Flag" message to the device. The controller conducts several tests during this process which can cause the process to repeat. This is because there is no means of sequencing the device acknowledgements, so corrupt acknowledgements are a frequent reason for repeating the process. Also the number of devices on the network is required, during the assignment process if the number of devices have not received a "Set Found Flag" signal the process is repeated. This results in unpredictable addressing duration. Once all the serial numbers have been found the addresses are assigned sequentially to each device given the serial number.

Patent 5952934 (Matsumoto) discloses a scheme wherein a controller (center unit) sends a terminal assignment request message on a control address (channel) which causes devices to respond with an acknowledgement and a temporary device ID. This temporary ID is then used to communicate with the controller and so the controller can assign a specific address. As part of this scheme if the device acknowledgement (including the temporary device ID) is invalid the process is repeated. This patent also teaches the use of a timer at the controller. This timer is randomly set and is used to restrict the controller from receiving responses from devices when a set of specific combinations of device and controller acknowledgements are not consistent with a successful assignment. In this case the controller will not receive a signal until the timer has expired. As with the previous patented devices an unpredictable addressing duration results.

An advantage of the applicant's approach for automatic addressing is that a fixed amount of time is needed. As can be understood by the above prior art, a controller could get stuck looking for devices for a long period of time. This problem is eliminated by fixing the number of available addresses, the amount of time allowed for any device to respond back to the controller and understanding that no devices are left to be addressed.

An additional advantage is that devices that do not understand the approach are excluded from participating. This is because the network is originally tested for each of a list of available addresses. A response to an address eliminates the address from the available addresses for use in the approach.

During this testing of available addresses, mentioned above, any devices which have fixed or mechanical switches setting their respective addresses are also excluded from participating. This eliminates confusion over how the address has been established. For example maintenance personnel can remove and replace legacy and fixed address devices without being concerned that the addresses will contend after an automated assignment.

BRIEF SUMMARY

This brief summary is included so as to introduce, in an abbreviated form, various topics to be elaborated upon below in the detailed description. This summary is not intended to identify key or essential aspects of the claimed invention. The summary is similarly not intended for use as an aid in determining the scope of the claims.

To begin the network includes a controller and devices located on a communication bus of some kind. The requirement of the communication bus is that the controller and devices can communicate on this bus.

The controller sends out a communication to all devices that can be automatically addressed to erase their respective addresses. Devices which have fixed addresses or addresses set with hardware such as latching switches remain addressed and do not respond to this communication.

The controller sends out communications using addresses from a predetermined list and awaits a response. If a response is received, a device with the corresponding address exists on the bus, the controller eliminates this address from the predetermined list as an available address for the automated addressing process. Once all addresses in the predetermined list have been tested the results is a list of available addresses.

Devices without an address included on a bus are receptive to a special arming communication. This arming communication causes these devices to establish a random amount of time using information integral to the specific device. Once the devices have determined this duration each device stops all other activity and awaits a trigger communication from the controller. It's important to note that, only devices which do not have an address assigned respond to these communications.

Upon receipt of the trigger communication each device starts a timer which has been set to "time out" after the respective random amount of time. During this time each device monitors the bus for any communication. When communication is detected the device drops out of the automated addressing process and remains unaddressed. When a device timer does "time out" the device sends a response to the trigger communication containing a unique identifier. Of course the only requirement of this unique identifier is that it is unique for each device responding to the trigger communication and is available to the device.

When the controller receives the device's unique identifier in response to the trigger communication, a communication containing the received unique identifier and the address to be assigned is transmitted to the bus. The device with a matching unique identifier responds by transmitting the unique identifier and the address back to the controller. At this point the device sets its address to the address received from the controller. If the controller receives acknowledgement of the address assignment from the device, the controller considers the address successfully assigned and uses the next available address in subsequent auto-addressing cycles. If the address assignment is not acknowledged, the same address is used in the next auto-addressing cycle.

DETAILED DESCRIPTION

Figure 1A:
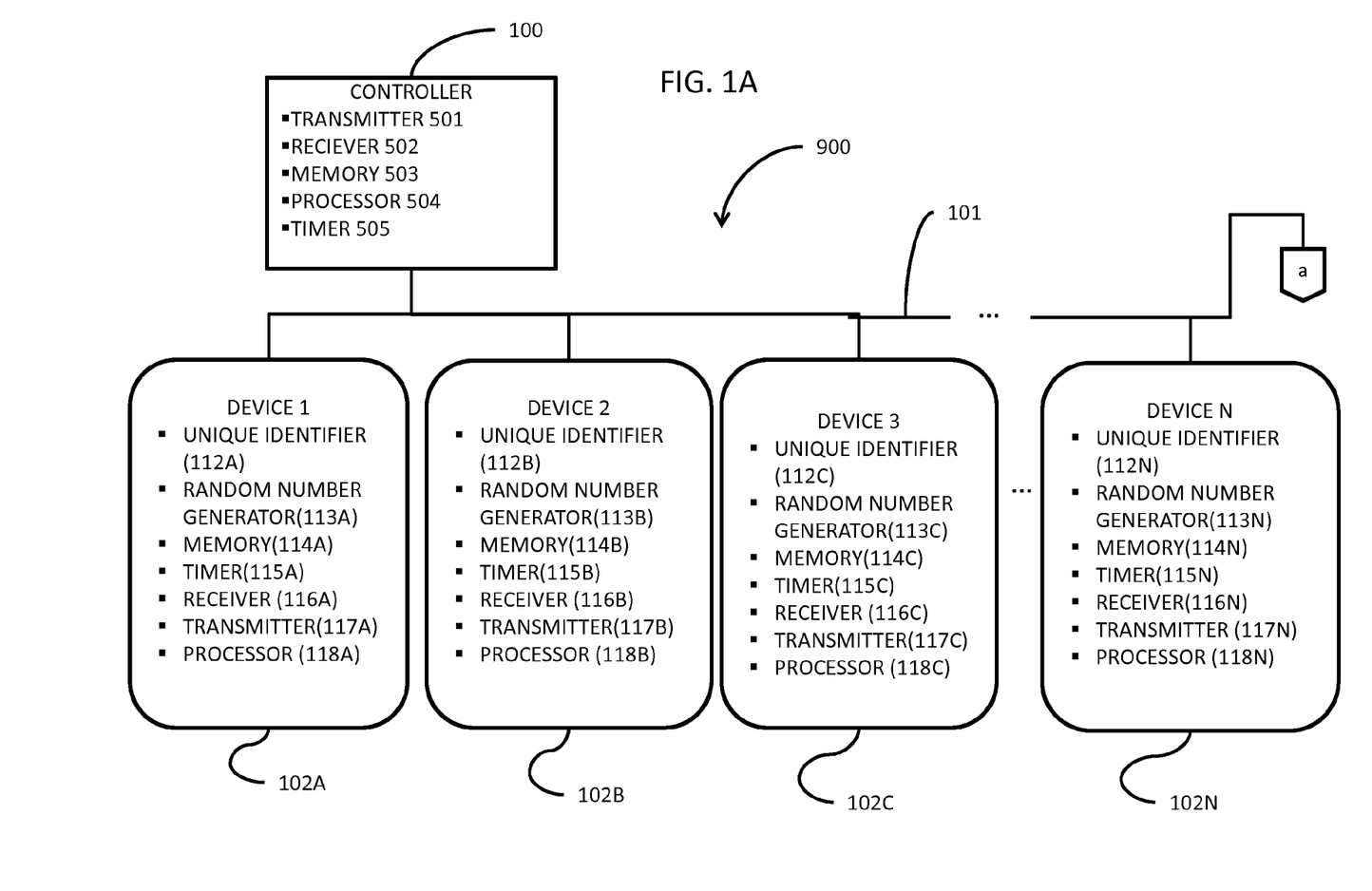
FIG. 1A Block Diagram Showing Overall network layout.
Figure 1B:
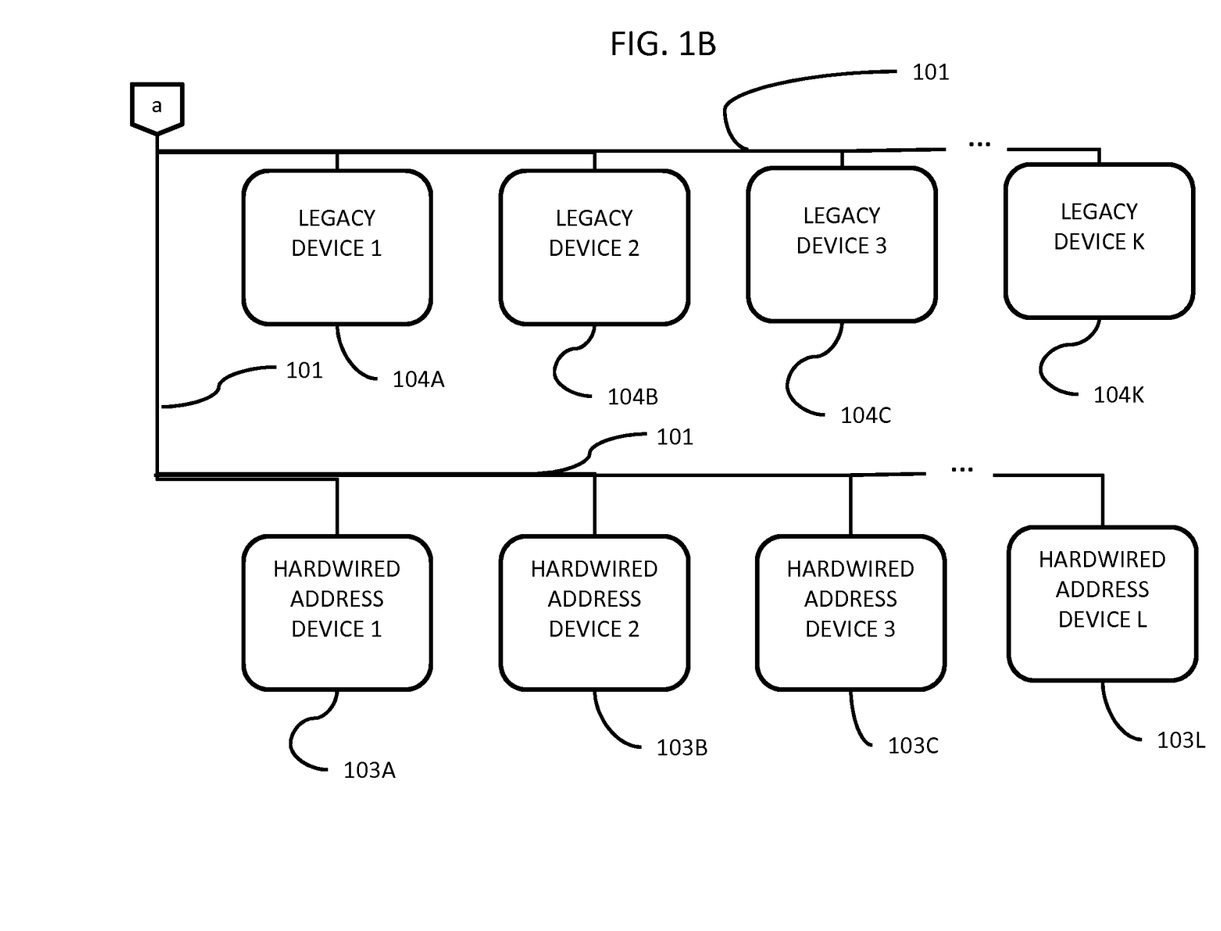
FIG. 1B Block Diagram Showing Overall network layout (continued).

Referring to FIG. 1A and FIG. 1B a network 900 is shown this network comprises a controller 100, a plurality of devices 102A thru 102N, a plurality of legacy devices 104A thru 104K, a plurality of hardwired devices 103A thru 103L and a bus connection 101 communicatively connecting the devices 102, 104 and 103 to the controller 100. FIG. 1B shows legacy devices 104 and hardwired devices 103 also connected to the bus connection 101 they are represented by 104A thru 104K and 103A thru 103L respectively. The bus connection 101 includes electrical connection such as serial, parallel, Universal Serial Bus and other types of communication including radio frequency, ultrasonic and light propagated signaling (i.e. microwave). The bus connection only requires that communications can be sent and received between the controller 100 and the devices 102, legacy devices 104 and hardwired devices 103.

The bus connection 101, controller 100 and devices 102 A thru N, legacy devices 104A thru K and hardwired devices 103 A thru L are not restricted to character based communication protocol but could include bitmapped based protocol typically used in internet networks. The bus communication only requires the ability to provide the required information consistent with the description below. Regarding the bus communication the applicant believes that the actual bus communication used, is and would be within the skill of a person of ordinary skill in the art. The applicant is also of the opinion that the type of bus communication is not germane to the invention.

The controller 100 may be a personal computer, a programmable logic controller or any other type of processor based device. The controller comprises a transmitter 501 and a receiver 502 both capable of communicating on the bus connection 101. Additionally, the controller 100 includes memory 503 capable of storing addresses, and unique identifiers. The controller also includes processing capabilities for executing the auto addressing process described below.

Each device 102 may include a unique identifier 112, a random number generator 113, a memory 114, a timer 115, a receiver 116, a transmitter 117 and a processor 118. Of course the receiver and transmitter 116 and 117 would be consistent with the type of bus connection, or combination thereof. Additionally, each device requires processing capabilities for executing the auto addressing process described below.

Prior to the start of an auto address process the controller memory 503 includes a list of available addresses to be discussed below.

Legacy devices 104A-K may be similar to devices 102A-N except they do not respond to the automated addressing scheme. However, they do have assigned addresses which are included in a list of available addresses.

Hardwired devices 103A-L may be similar to devices 102A-N except they also do not respond to the automated addressing scheme. However, they also have assigned addresses which are included in a list of available addresses to be discussed below. The name "hardwired devices" includes any device which has an address which is not erased when the controller 100 sends an erase communication. For instance in one embodiment a device of this type could define its address by latching switches.

The controller 100 may include receiver 501 and transmitter 502 consistent with the type of bus connection 101 described above. In addition the controller 100 includes a processor 504 programmed to respond to communication on the bus connection 101 as described below.

Figure 2A:
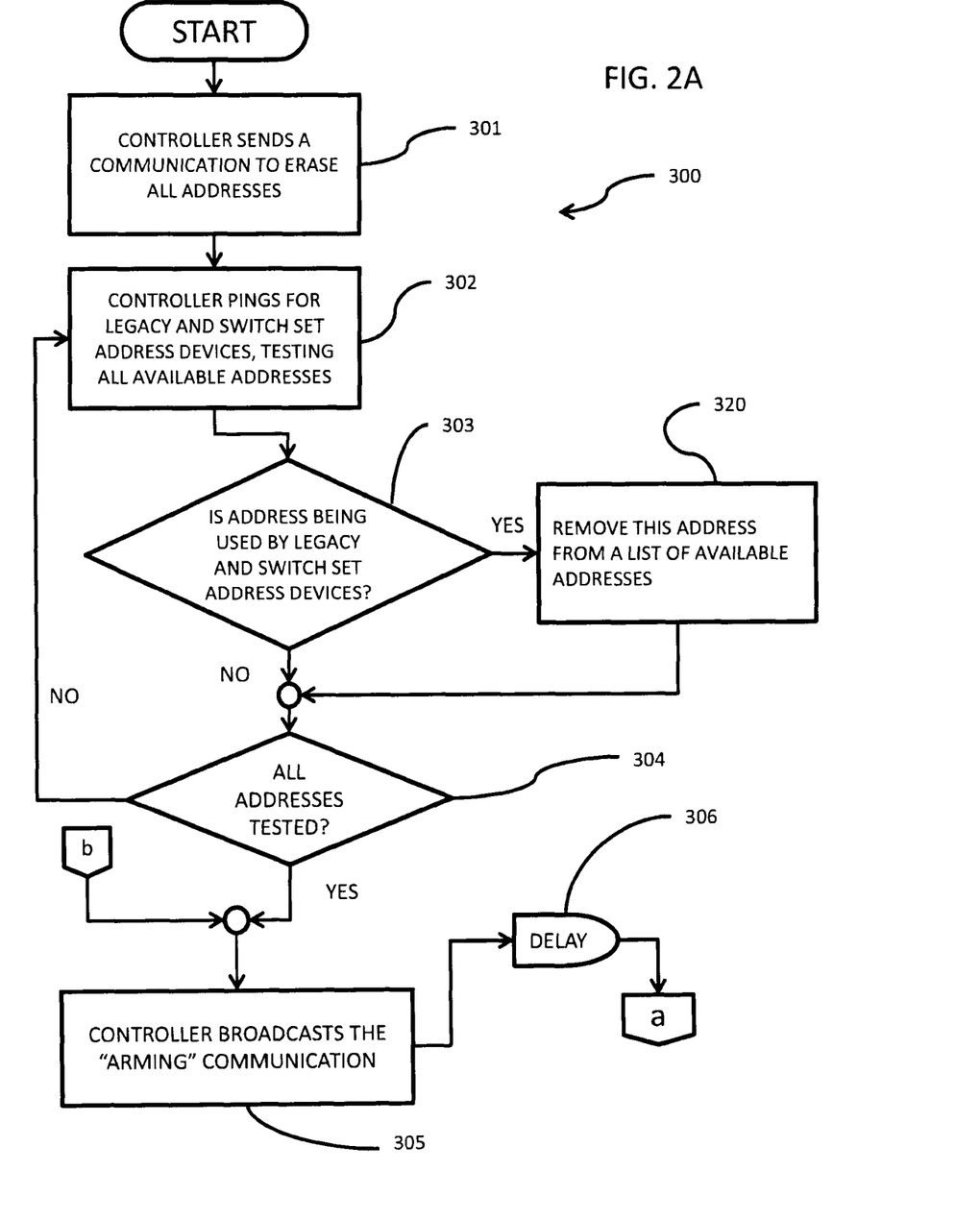
FIG. 2A Flowchart of the controller operations.

First the controller 100 prepares for automatic addressing. Referring to FIG. 2A step 301 is initiated on the bus connection 101 by the controller 100. This step 301 sends a communication causing all devices 102 to erase their address. Hardwired devices 103 and legacy devices 104 are non-responsive to this communication. The controller 100 continues to step 302 and sends a communication using one address from a list of available addresses. As seen in the figure this is also referred to as pinging. Comparison 303 is used to determine if a device 103A-L or 104A-K responds to the corresponding address, if a response is received the address is eliminated from the list of available addresses by performing step 320. After step 320 or if comparison 303 results in no response the controller 100 executes comparison 304 and determines if all of the available addresses have been tested. If not the controller 100 returns to step 302 and repeats processes 302 and 303 until all available addresses have been tested. If step 304 indicates that all addresses have been tested the controller 100 continues to step 305. In this way the unavailable addresses are eliminated from the available addresses list. The remaining available addresses establish a predetermined list of addresses for this embodiment.

Next the controller 100 issues an arming communication on the bus connection 101 at step 305 of FIG. 2A and waits for a predefined delay 306 (5 micro seconds in one embodiment). If any of the devices 102, legacy devices 104 and hardwired devices 103 has an address they are not responsive to this arming communication.

Figure 3A:
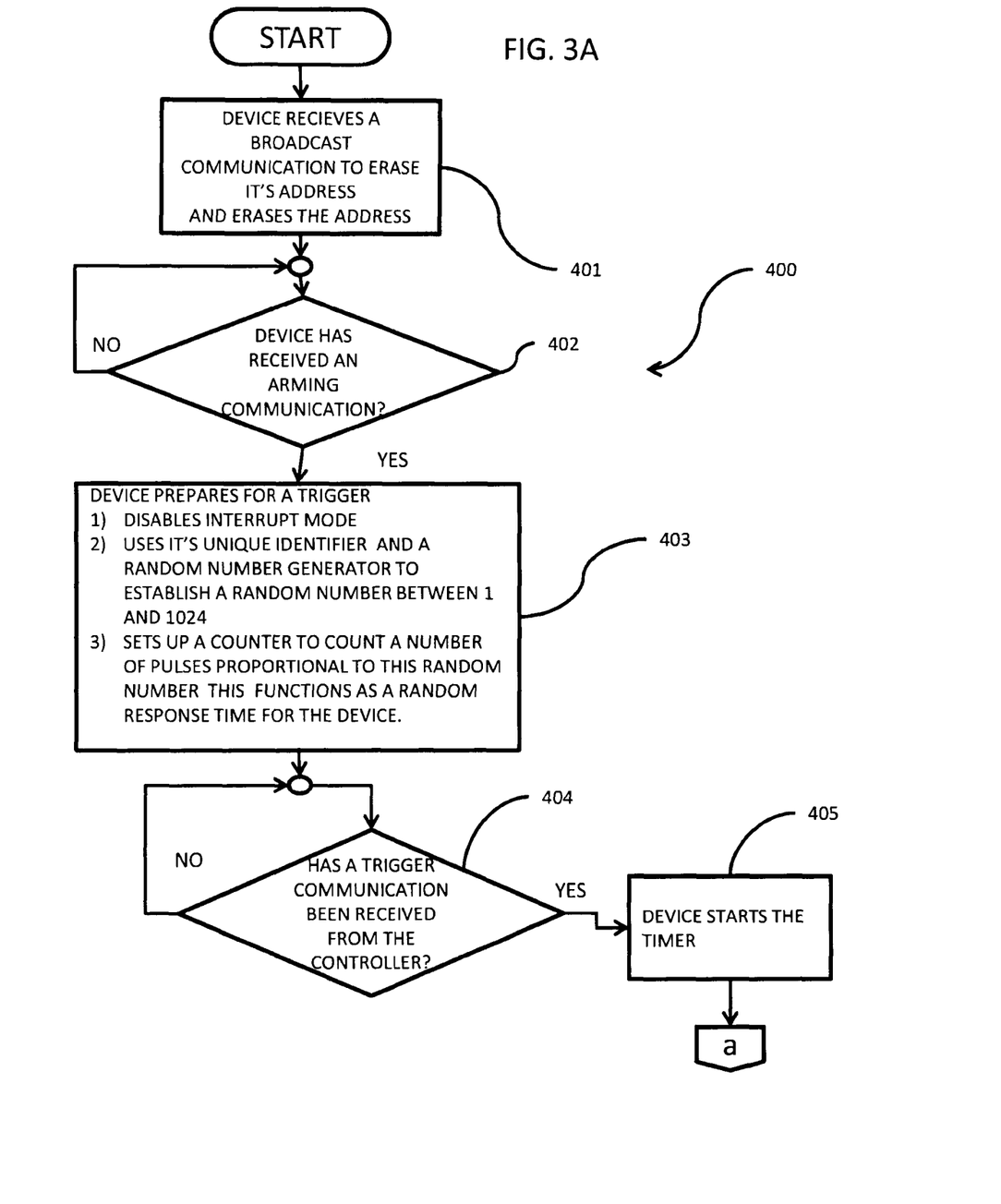
FIG. 3A Flowchart of device operations.
Figure 3B:
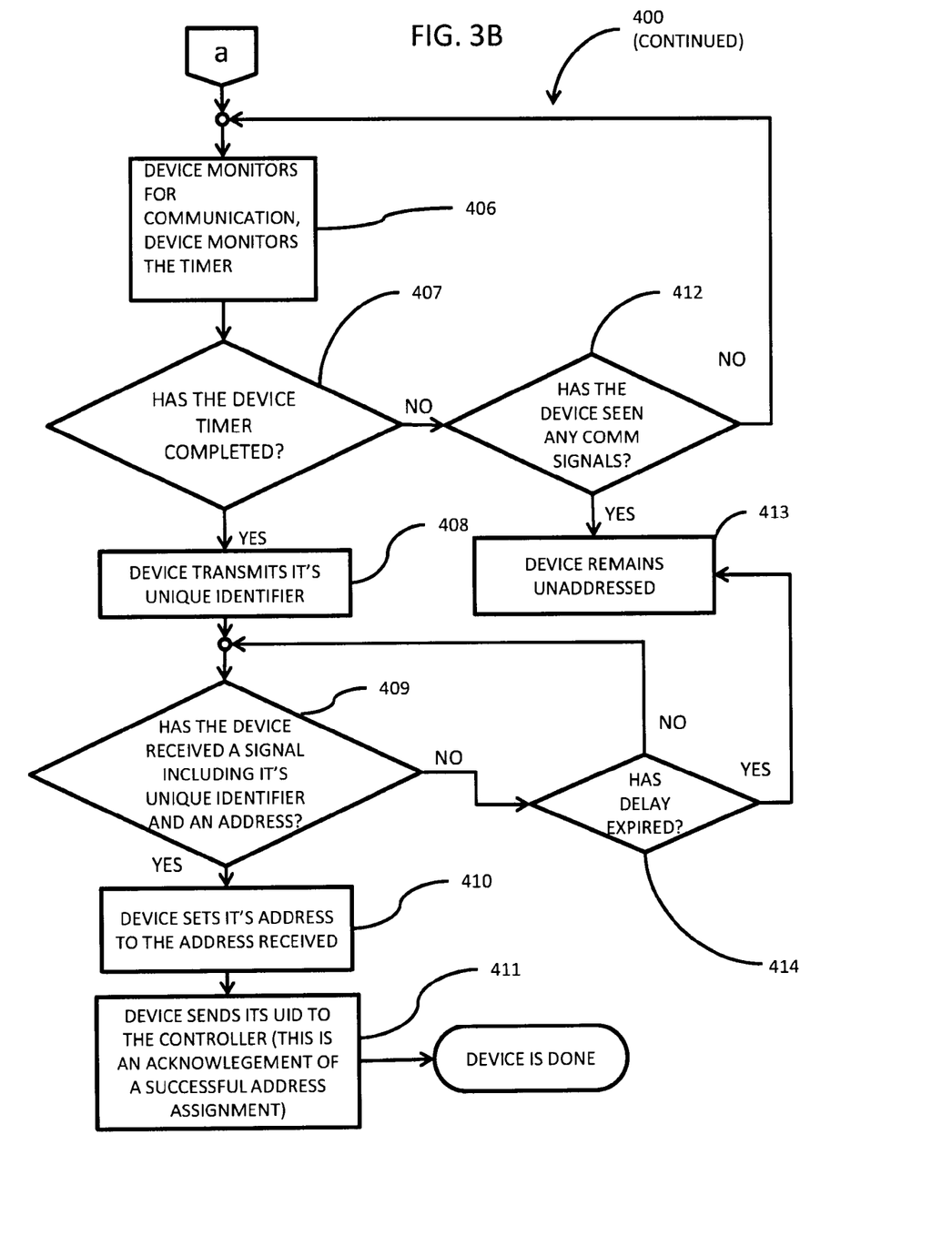
FIG. 3B Flowchart of device operations (continued).

Now consider device flowchart 400 shown in FIG. 3A and FIG. 3B. First as explained earlier each device 102A-N has erased the address as instructed by the controller 100 in step 401. Comparison 402 is the next step, so the devices 102A-N are waiting for an arming communication from the controller 100. Once the devices 102A-N receive the arming communication they proceed to step 403. The devices 102A-N prepare for a trigger communication from the controller 100 this includes disabling their interrupt mode (if they have one) so that it will be able to quickly respond to a trigger communication. Also during step 403 they each determine a random response time in response to this arming communication. To do this they determine a random number by using their unique identifier 112 (UID) to seed their random number generator 113. Each device's timer 115 is set to count to a number proportional to each device's random number at a predefined clock speed. The random number generator 113 is limited to generate numbers within a predetermined limit (for example 1 to 1023). The time that is required for the counter to count to this amount is the random response time in this embodiment. Additionally, since the random number is limited in size (for example 1023) this also establishes a maximum response time.

After step 403 the devices 102A-N proceed to comparison 404 and start looking for a trigger communication. When a trigger communication is received the devices 102A-N start their timers 115 and begin to wait for the random response time amount as shown in step 405. Next, referring now to FIG. 3B, the devices 102A-N monitor the bus connection 101 for receipt of any communication on the bus connection 101 as shown in step 406. Step 406 includes the two comparisons 407 and 412. Comparison 407 determines if the timer 115 has "timed out" and comparison 412 determines if any communication has been received on the bus connection 101. If both these comparisons result in "NO" as shown in FIG. 3B the devices 102A-N continue to monitor as in step 407 and 412. During the comparison 412 a "YES" determination the corresponding device 112 proceeds to step 413 and remains unaddressed. Notice that normally only a single device 112 will end up proceeding to step 408. This is because all the device timers 115A-N are set to random durations. The remaining devices 102 typically end up at step 413 and are not assigned an address.

Figure 2B:
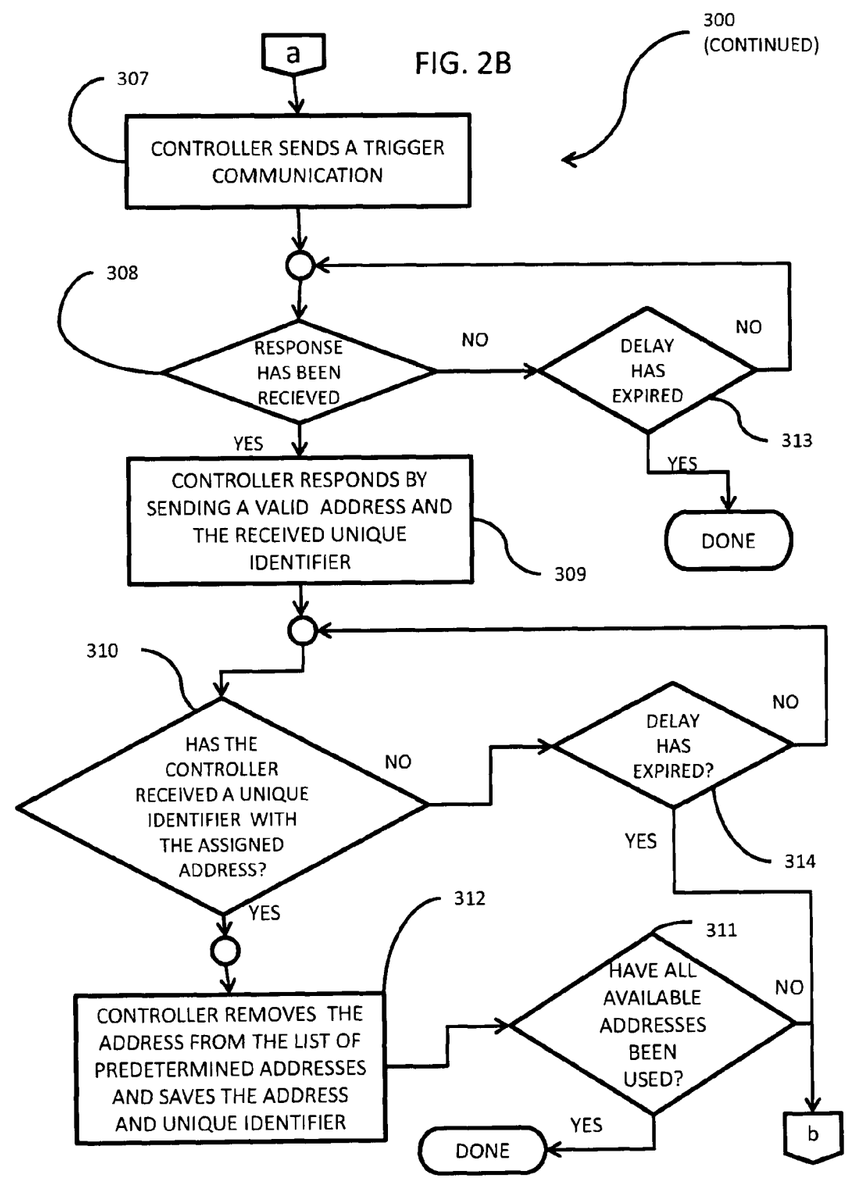
FIG. 2B Flowchart of the controller operations (continued).

Returning to functions the controller 100 performs refer to FIG. 2B. The controller 100 issues a communication in step 307, this is the trigger communication and causes the devices 102A-N to start their respective timers 115A-N. As shown in comparisons 308 and 313 the controller 100 monitors to determine if a response has been received 308 or a duration has elapsed using the timer 505 at comparison 313. If comparison 313 is a "YES" the auto addressing process is complete as no more devices 112A-N have responded. However, if a response is received the controller proceeds to step 309.

Returning now to the operation of devices 102 refer to FIG. 3B, if one of the timers 115 "times out" the particular device 102 transmits its response communication comprising the unique identifier 112 on the bus connection 101 as shown in step 408. The remaining devices 102 as stated above proceed to step 413 caused by communication on the bus connection 101 as shown in comparison 412 and so remain unaddressed. Since these devices 102 are not yet addressed, they are responsive only to an additional arming communication.

Next, the controller 100 receives a response communication from the device 102 in step 308 which includes the devices' 102 unique identifier 112. This response causes the controller 100 to start the assignment process in step 309 as stated above. The controller 100 sends a communication on the bus connection 101 which includes an address from the list of predetermined addresses and the devices' 102 unique identifier 112 it just received as shown in step 309.

Note that it is possible for multiple devices 102 to respond at times that overlap. This is very unlikely; however this is taken into account. The device 102 which responds by continuing to step 408, waits at step 409 via comparison 414 to determine if it receives the specific address being tested and its unique identifier 112. If the device 102 does not receive a response over a length of time defined in comparison 414 it proceeds to step 413 and remains unaddressed. If it receives this information back from the controller 100, the device 102 saves this address at step 410 in memory 114 as its address. Next the device 102 transmits its unique identifier 112 and the address to the controller 100 as shown in step 411. If the device 102 does not receive the correct unique identifier 112 it does not respond or save the address. The controller 100 determines that a response has not been sent by applying comparisons 310 and 314 as stated above and concludes that the address will need to remain on the list of predetermined addresses as shown in steps 310 and 314.

The controller 100 receives a communication on the bus connection 101 and determines that the correct unique identifier 112 and address is included in step 310. If the correct unique identifier 112 and address has been received the controller 100 proceeds to step 312 and saves the address and unique identifier 112 in the controller memory 503 and removes it from the list of predetermined addresses.

Next the controller 100 proceeds to comparison 311 and determines if all of the predetermined addresses have been tested, if not it returns to step 305 to issue an arming communication. Doing this continues the search for additional unaddressed devices 102A-N. If all the available addresses have been used the process is complete. As discussed above devices 102A-N that do not have an address, respond to the arming communication of controller 100 at step 305.

Once all the devices 112 have addresses, the controller 100 will not receive a response from a trigger communication in step 308 within the maximum response time as indicated in comparison 313 of FIG. 2B. The controller 100 starts a timer 505 which is set to this maximum response time as previously explained, and determines if a response has been received prior to this timer 505 timing out at comparison 313. The controller 100 understands that this will mean that all devices 102A-N have a corresponding address and so no more addresses need to be tested.

In the interest of showing possession of the invention partial code listings for one embodiment are available in Appendix A and Appendix B. Appendix A contains code run by the controller and Appendix B contains code run by each device, listings for the legacy and hardwired devices are not included. The terminology used in these code snippets, refer to a specific application and in general "Beam" refers to the controller 100 and "Knifeholder" refers to the devices 102. The code in Appendix A is run on a PC (i.e. controller) and the code in Appendix B is run on a processor located at each knifeholder (i.e. device). Both of these snippets are written in C. The code run on the devices is downloaded using a compiler or other comparable tool which interfaces to the device processors. The device processor in one embodiment is an Atmel ATSAM3S1BA (an ARM Cortex-M3 Microcontroller) in this case the development software includes an Integrated Development Environment (IDE) which contain an editor, compiler/linker, debugger and the added convenience to program the device without leaving the development environment. A means of programming the devices is not germane to the invention and is only a tool by which the invention can be carried out.

Regarding the advantages mentioned above, consider the need for a predictable duration for automatically addressing devices in a network. The number of addresses and the maximum response time is restrained. The process will never be longer then the maximum response time multiplied by the number of devices. For example consider a system with 5 devices each with a random number generator 113 for generating numbers between 1 and 1023. In this case there would be 5 timer runs (one for assignment of each address) and each run could last only 1023 microseconds this being the maximum response time. This would result in a total addressing duration of 5*1023=5115 microseconds. Of course each run would not be the maximum 1023 microseconds. Also if this maximum response time is to short, then the values generated by each random number generator could be multiplied by a number including one and the timer could be set to a value proportional to the random number.

Regarding the advantage of ignoring legacy and hardwired devices on the network. Since this scheme has a fixed number of allowable addresses each address can be checked quickly. After the controller issues an erase address communication the controller can assume that addresses that still generate a response are valid legacy or hardwired device addresses, the controller can eliminate these addresses from the addresses to be used during the auto addressing process. Two advantages are realized by this feature. First legacy devices require no modifications and are completely compatible. The devices with hardwired addresses, since they are not capable of erasing their addresses remain completely compatible also. Secondly, the auto-addressing duration is reduced by the number of legacy and hardwired devices on the network.

Regarding the advantage of hardwired devices being removed or added to a network, consider a device which is intended to perform a specific task. Several devices (not connected to the network) could have this same hardwired address and when placed in the network the controller could have them doing a specific task without the need for re-addressing the network.

Numerous characteristics, advantages, and embodiments have been described in detail in the foregoing description with reference to the accompanying drawings. However, the above description and drawings are illustrative only. The invention is not limited to the illustrated embodiments, and all embodiments need not necessarily achieve all of the advantages or purposes, or possess all characteristics, identified herein. Various changes and modifications may be effected by one skilled in the art without departing from the scope or spirit of the invention. Although example materials and dimensions have been provided, the invention is not limited to such materials or dimensions unless specifically required by the language of a claim. The elements and uses of the above-described embodiments can be rearranged and combined in manner other than specifically described above, with any and all permutations within the scope of the invention.

We claim:

1. A method of automatic addressing on a network having a controller, a predetermined list of addresses, and a plurality of devices each device having a unique identifier comprising:
   i) said controller preparing for automatic addressing;
   ii) said controller sending an arming communication to each device;
   iii) each device without an address, establishing a random response time which is less than or equal to a maximum response time after receiving said arming communication;
   iv) said controller sending a trigger communication to said plurality of devices without an address, causing each said device without an address to apply said random response time;
   v) each said device without an address responding to said trigger communication by determining said random response time has expired and no other device without an address has responded and sending a first response communication which includes the devices' unique identifier thus becoming the first responding device;
   vi) each device without an address determining if any device has responded and if so discontinuing said waiting and remaining unaddressed and returning to a state for receiving an additional arming communication;
   vii) the controller assigning an address from said predetermined list of addresses to the device that sends said first response signal and removing said address from said predetermined list of addresses; and
   viii) repeating steps ii thru vii until no devices respond to a triggering communication within said maximum response time.

2. The method of claim 1 wherein each device uses a timer to wait said random response time.

3. The method of claim 1 wherein said establishing a random response time for each plurality of devices is determined by a random number generator seeded with said devices' unique identifier.

4. The method of claim 1 wherein said devices' unique identifier is of character based protocol.

5. The method of claim 1 wherein said assigning an address comprises:
   i) said controller sending a second communication which includes said address and said first responding devices' unique identifier;

ii) said responding device saving said address in said device memory and sending said address and said device unique identifier to said controller; and iii) said controller saving said address and said devices' unique identifier in the controller memory.

6. The method of claim 1 wherein preparing each device for automatic addressing includes;

i) erasing addresses from all devices;

ii) selecting an address from a list of available addresses;

iii) sending a communication including said address with a request for a response on said bus connection;

iv) receiving a response to said request via said bus connection;

v) removing said address from said list of available addresses;

vi) repeating steps ii) thru v) until no responses are received.

\* \* \* \* \*